United States Patent [19]

Wertheim

[11] Patent Number: 4,678,723

[45] Date of Patent: Jul. 7, 1987

[54] HIGH PRESSURE LOW HEAT RATE PHOSPHORIC ACID FUEL CELL STACK

[75] Inventor: Ronald J. Wertheim, Hartford, Conn.

[73] Assignee: International Fuel Cells Corporation, South Windsor, Conn.

[21] Appl. No.: 926,164

[22] Filed: Nov. 3, 1986

[51] Int. Cl.$^4$ ............................................. H01M 8/04
[52] U.S. Cl. ...................................... 429/17; 429/19; 429/20; 429/46
[58] Field of Search .................... 429/17, 19, 20, 120, 429/72, 46

[56] References Cited

U.S. PATENT DOCUMENTS

| | | | |
|---|---|---|---|
| 3,905,884 | 9/1975 | Parenti, Jr. et al. | 204/129 |
| 4,004,947 | 1/1977 | Bloomfield | 429/17 |
| 4,120,787 | 10/1978 | Yargeau | 429/20 X |
| 4,344,849 | 8/1982 | Grasso et al. | 210/662 |
| 4,539,267 | 9/1985 | Sederquist | 429/17 |

Primary Examiner—Anthony Skapars
Attorney, Agent, or Firm—William W. Jones

[57] ABSTRACT

The fuel cell stack is a phosphoric acid fuel cell stack which can operate at higher pressures because it does not use steam in the operation of the reformer portion. By being able to operate at higher pressures, the stack displays very low system heat rates and thus higher operating efficiency. The higher operating pressure also results in improved fuel cell power density and reduced cost. The stack is cooled by a coolant mixture of air and entrained water droplets comprising cathode exhaust and injected water fog. During the cooling operation, the water droplets in the coolant mixture are vaporized in the cooling passages of the stack. The exhaust from the cooling system after being heated is then delivered to an autothermal reformer where it reacts with a raw fuel reactant to produce hydrogen for operating the fuel cells in the stack. The reformer does not require a separate burner to operate properly.

7 Claims, 3 Drawing Figures

HIGH PRESSURE LOW HEAT RATE PHOSPHORIC ACID FUEL CELL STACK

DESCRIPTION

TECHNICAL FIELD

This invention relates to an improved fuel cell stack, and more particularly, to a phosphoric acid fuel cell stack which can operate at higher pressures resulting in increased efficiency, improved power density and reduced cost.

BACKGROUND ART

Fuel cell stacks wherein the cells in the stack use a phosphoric acid electrolyte along with oxygen and hydrogen reactants to produce electricity and water are well known in the prior art. Phosphoric acid fuel cell stacks of the prior art have been temperature controlled with a water coolant which passes through separate cooling passages in the stack and is exhausted from the stack cooling passages as a two phase water-steam mixture. The water and steam components of this two phase mixture are then separated whereupon the water can be used once more to control stack temperature and the steam is piped to a reformer to be reacted with a raw fuel, such as methane or the like, to produce the hydrogen fuel reactant for the stack. The temperature of the reformer is maintained at a proper level by an associated burner which has its own fuel supply. U.S. Pat. No. 4,344,849, granted Aug. 17, 1982, to A. P. Grasso et al. discloses a form of a fuel cell stack which operates generally in the aforesaid manner. A limiting factor in the operation of this type of fuel cell stack arises from the use of steam to operate the reformer. The temperature and thus the pressure of the steam generated is limited by the stack operating temperature. Current state-of-the-art is 405° F. This limits stack operating pressure to the range of 120-170 psia. These relatively low operating pressures in turn limit the optimization of heat rate and operating efficiency, and also limit achievable cell power density with a resultant increase in cost. Additionally, as noted above, the use of steam to operate the reformer requires a reformer burner which, in turn, requires its own fuel source.

The system of this invention does not use steam to operate the reformer and therefore the stack can operate under higher internal pressures with resultant lower heat rates and attendant increased efficiency, as well as improved cell power density and lower cost. Additionally, the system of this invention does not require use of a reformer burner to maintain the proper operating temperatures in the reformer. Cooling of the stack in accordance with this invention is accomplished by cycling moist oxygen-depleted exhaust gas from the cathode side of the fuel cells back to the cooling passages of the stack. Before reaching the stack cooling passages, water is entrained in the recycled cathode exhaust gases in the form of a fog. The coolant in this invention thus is a mixture of water fog entrained in the moist oxygen-depleted cathode exhaust gases. This mixture is circulated through the cooling passages where the water droplets entrained in the mixture are vaporized so as to cool the cells in the stack. The exhaust from the cooling passages is thus a mixture of water vapor, oxygen and nitrogen. This contrasts to the steam and water coolant exhaust formed in the prior art. Since the only water present in the exhausted coolant is in the form of water vapor, the internal pressure of the stack can be maintained in the range of 200 psia to 600 psia, and preferably at 400 psia. This will be done with turbocompressors as will be pointed out in greater detail hereinafter. The exhausted coolant then has its temperature raised to an appropriate level whereupon it is piped into an autothermal reformer to react with a heated raw fuel, such as methane or the like. The presence of heated oxygen gas in the reformer renders the hydrogen-producing reaction autothermal so that the hydrogen gas produced in the reformer is at the same temperature as the incoming oxygen-nitrogen-water vapor reactant mixture without the need of an auxiliary reformer burner. The elevated operating pressure in the stack produce high stack cell power densities at lower heat rate, typically 400 watts/ft$^2$ power density at a 7500 Btu/Kwhr heat rate. This compares to the steam reformer low pressure stack which will typically produce about 140 watts/ft$^2$ power density at a heat rate of about 8300 Btu/Kwhr. Heat rate is defined as the Btu/hr of fuel input required per kilowatt of electricity produced.

It is therefore an object of this invention to provide an improved phosphoric acid fuel cell stack system which operates at higher efficiency levels, produces higher power densities and is more economical to operate.

It is an additional object of this invntion to provide a fuel cell stack system of the character described which can operate at higher internal pressures.

It is a further object of this invention to provide a fuel cell stack system of the character described which uses a gaseous mixture of oxygen, nitrogen, (or air) and water vapor as a reformer reactant.

It is yet another object of this invention to provide a fuel cell stack system of the character described wherein the reformer reaction is autothermal, requiring no auxiliary reformer burner for the reaction to be completed.

These and other objects and advantages of this invention will become more readily apparent from the following detailed description of a preferred embodiment thereof when taken in conjunction with the accompanying drawings.

BEST MODE FOR CARRYING OUT THE INVENTION

Figure 1:
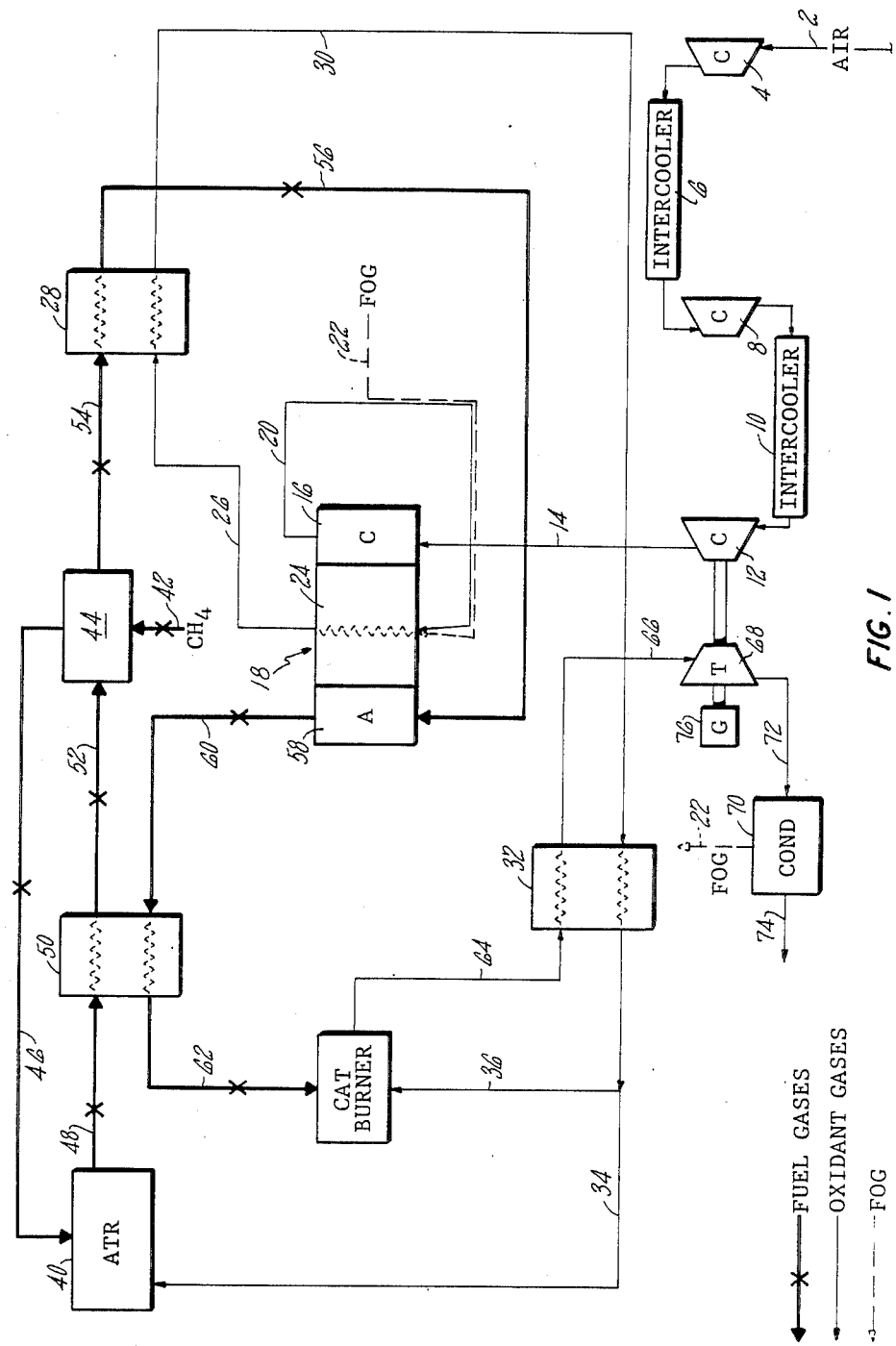
FIG. 1 is a schematic drawing of a fuel cell stack system formed in accordance with this invention.

Referring now to FIG. 1, there is shown schematically an improved fuel cell stack system formed in accordance with this invention. The cells in the stack shown are of the type which utilize phosphoric acid as the electrolyte and oxygen and hydrogen as the reactants. Air enters the system at 2 at ambient temperature whereupon it is compressed in compressor 4 to a pressure of about 45 psia and a temperature of about 335° F. The compressed, heated air then passes through an intercooler 6 where it is cooled to a temperature of about 130° F. whereupon it passes through compressor 8 to be compressed to a pressure of about 130 psia and its temperature is elevated to about 385° F. The compressed, heated air passes through a second intercooler 10 where its temperature is again lowered to about 130° F. The air then passes through compressor 12 where it is compressed to an operating pressure of about 400 psia and a temperature of about 390° F. From the compressor 12, the air passes into the cathode side 16 of the stack 18 via passage 14. The oxygen-depleted air is exhausted from the cathode side 16 of the stack 18 via passage 20 at a temperature of about 450° F. The air leaving the stack at 20 contains moisture which is produced as a byproduct in the electrochemical reaction in the stack. A water fog gas is entrained in the cathode exhaust stream in passage 20 from branch passage 22. The water fog is at a temperature of about 138° F. whereby the cathode exhaust-water fog mixture has a temperature of about 400° F. The moist cathode exhaust-water fog mixture is passed through the cooling portion 24 of the stack 18. The water droplets in the mixture vaporize in the cooling portion 24 cooling the cells, and the air-water vapor mixture exhausted from the cooling portion 24 via passge 26 has a temperature of about 405° F. The air-water vapor mixture then passes through heat exchanger 28 where its temperature is raised to about 550° F. whereupon it passes via passage 30 to a subsequent heat exchanger 32. The temperature of the air-water vapor mixture is raised to about 1400° F. in the heat exchanger 32 whereupon the heated mixture passes into conduit 34. A portion of the heated mixture is bled from conduit 34 into passage 36 from whence it is fed into catalytic burner 38 to help fire the latter. The remainder of the heated air-water vapor mixture is fed to the autothermal reformer 40 where it reacts with raw fuel to form the hydrogen needed to fuel the stack 18.

The raw fuel, such a methane or the like, enters the system via passage 42 at substantially ambient temperature. It passes from the passage 42 through a heat exchanger 44 where its temperature is raised to about 600° F. It then passes through the conduit 46 to the autothermal reformer where it reacts with the air-water vapor mixture to form hydrogen for use in the stack 18. The hydrogen-rich gas leaves the reformer 40 via passage 48 at a temperature of about 1400° F. It will be noted that the hydrogen-rich gas emitted by the reformer has the same temperature as the air-water vapor mixture admitted to the reformer from the passage 34. The hydrogen-rich gas passes from the passage 48 into a heat exchanger 50 wherein its temperature is lowered to about 700° F. and from which it passes into conduit 52. From conduit 52 the fuel gas passes through the heat exchanger 44 where its temperature is lowered to about 650° F. whereupon it passes into conduit 54. In heat exchanger 28, the temperature of the fuel gas is lowered to about 470° F. before it passes into conduit 56. The fuel gas passes from conduit 56 into the anode side 58 of the stack 18 at the temperature of about 470° F. and depleted fuel gas exhaust enters conduit 60 from the stack 8 at a temperature of about 400° F. In the heat exchanger 50 the hydrogen depleted exhaust gas has its temperature raised to about 1260° F. before passing into the catalytic burner 38 via passage 62. The exhaust from the catalytic burner 38 passes through conduit 64 at a temperature of about 1600° F. to the heat exchanger 32. In the heat exchanger 32 the temperature of the catalytic burner exhaust is lowered to about 785° F. The cooled exhaust is then taken through conduit 66 from whence it is used to drive a turbine 68 which powers the air compressors 4, 8 and 12 which constitute, in fact, a three stage compressor shown as three separate stations for purpose of illustration. The exhaust from the turbine 68 is channeled to a condenser 70 via conduit 72 at a temperature of about 180° F. In the condenser 70 the temperature of the turbine exhaust is lowered and the water fog is generated at a temperature of about 140° F. to be returned to the coolant conduit 20 via the passage 22. The condenser 70 is exhausted via passage 74. The turbine 68 also drives a generator 76 which can produce a significant amount of electricity, up to about one-third of the total power output of the system.

Figure 2:
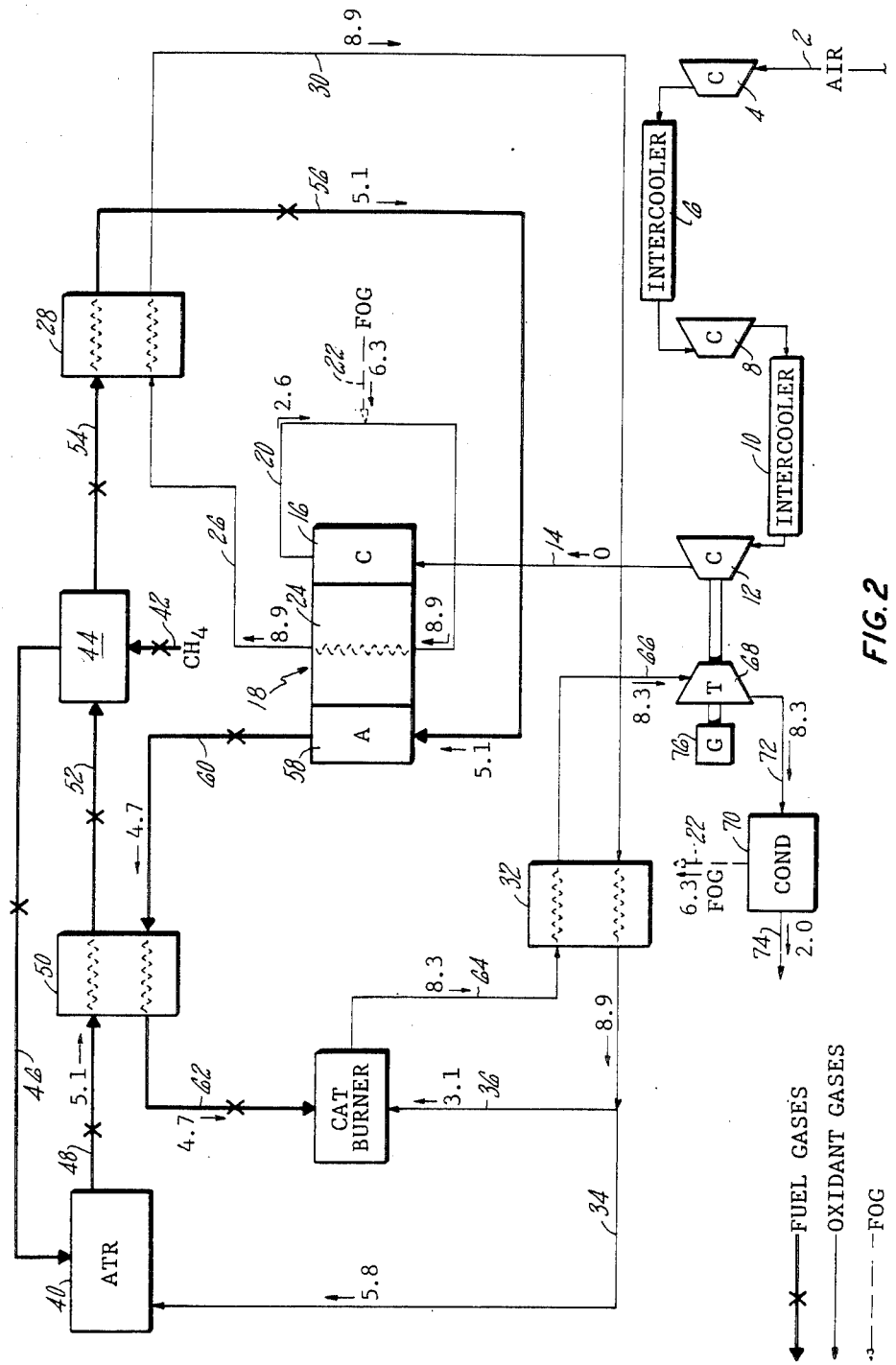
FIG. 2 is a flow chart similar to FIG. 1, but showing the mole concentrations of water at various locations during operation of the system.

With respect to the water content of the gases circulating through the system, FIG. 2 approximates the water content at various locations throughout the system in molar equivalents per each mole of methane in the system. It will be appreciated that the water content needed to operate the system is generated in the reactions in the cells of the stack and in the catalytic burner. Equilibrium is maintained by exhausting an equivalent amount of water from the condenser 70 as is formed by the electrochemical reaction.

Figure 3:
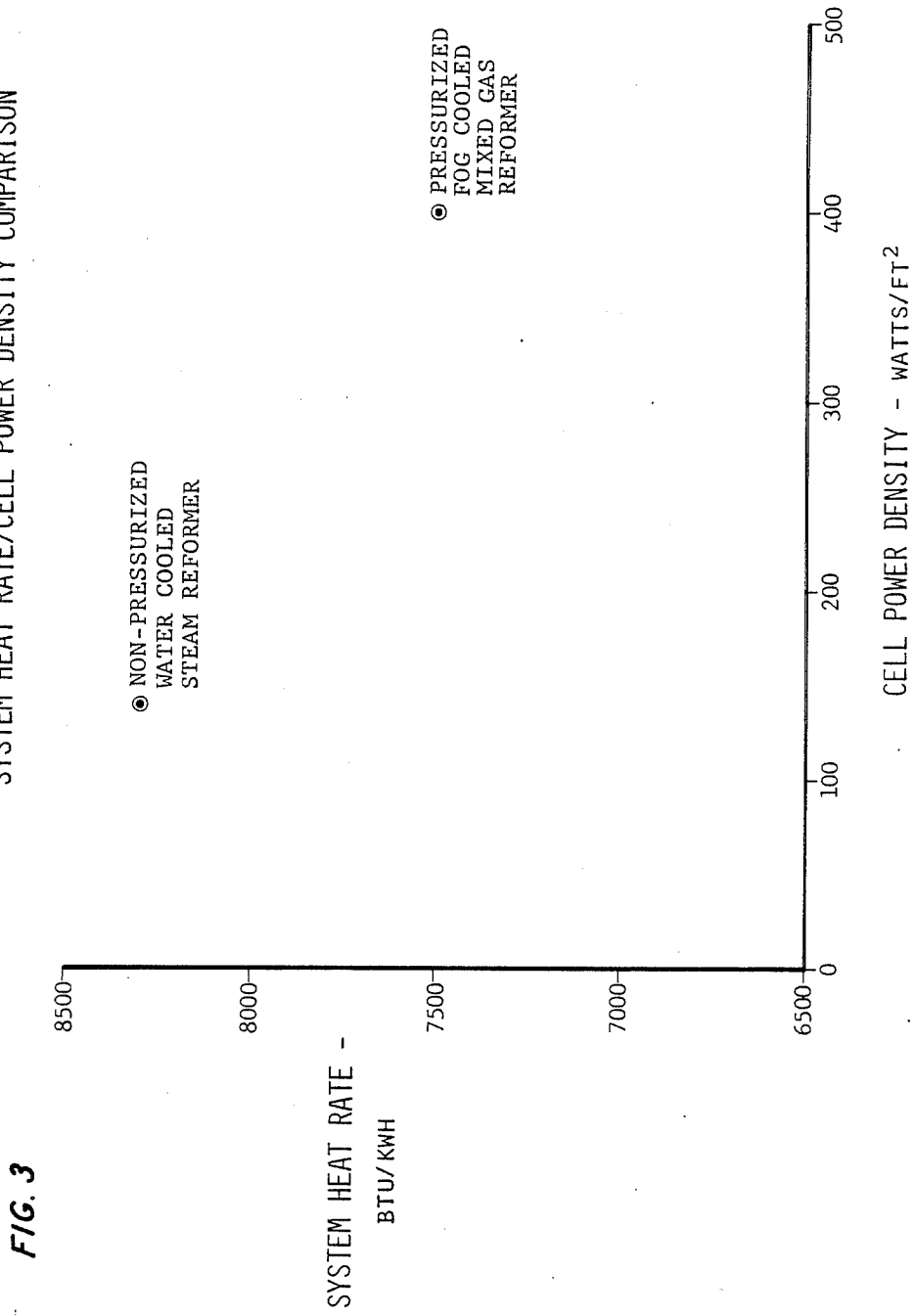
FIG. 3 is a chart comparing the operation of a fuel cell stack system formed in accordance with this invention with a similar stack system formed in accordance with the prior art.

Referring now to FIG. 3, there is shown a graphic representation comparing operation of a stack formed in accordance with this invention with a stack which operates in accordance with the prior art and generates steam by using a water coolant. It will be noted that the system of this invention can generate a cell power density of about 400 watts/ft$^2$ at a system heat rate of about 7500 Btu/Kwhr. The stack will be pressurized to about 400 psi to achieve these operating conditions. These conditions can be varied by varying the pressure in the stack. Higher cell power densities can be reached at about the same system heat rate by increasing the internal pressure in the stack. Internal stack pressures in the range of about 200 psia to about 600 psia are contemplated by the invention. As for the prior art stack cooled by water and using a steam reformer, the presence of the steam limits the maximum internal pressure to about 120 psia. At this pressure, the stack will generate a cell power density of about 140 watts/ft$^2$ and a system heat rate of about 8300 Btu/Kwhr. It is readily apparent that higher power densities, and resultant lower cost, at higher efficiencies will be realized by the system of this invention.

Since many changes and variations of the disclosed embodiment of the invention may be made without departing from the inventive concept, it is not intended to limit the invention otherwise than as required by the appended claims.

I claim:

1. A high pressure phosphoric acid fuel cell stack assembly comprising:
    (a) a stack of fuel cells for producing electricity, said stack including cathode means, anode means, and heat exchange means;
    (b) means for delivering pressurized air to said cathode means;
    (c) means for delivering a hydrogen rich fuel gas to said anode means for electrochemically reacting with oxygen in the pressurized air to produce electricity and water;
    (d) first conduit means connected to said cathode means for exhausting a mixture of oxygen-depleted air and reaction water from said cathode means;
    (e) second conduit means connected to said first conduit means for delivering a water fog to said first conduit means for entrainment in said mixture of oxygen-depleted air and reaction water to form a two phase coolant having a gaseous air phase and an entrained water droplet phase;

(f) means for circulating said coolant to said heat exchange means to cool said stack solely through vaporization of said water droplet phase in said heat exchange means whereby a mixed gas exhaust of air and water vapor is exhausted from said heat exchange means; and (g) means for heating said mixed gas exhaust and delivering the heated mixed gas exhaust at reformer reaction temperatures to an autothermal reformer in said stack assembly for autothermal reaction with a raw fuel to form said hydrogen rich fuel.

2. The stack assembly of claim 1 further comprising catalytic burner means operably connected to said anode means for receiving depleted hydrogen fuel gas exhaust from said anode means; third conduit means operably connected to said catalytic burner means and to said means for heating and delivering, said third conduit means being operable to deliver a portion of said heated mixed gas exhaust to said catalytic burner means for catalytic combustion with said depleted hydrogen fuel gas to produce a high temperature catalytic burner exhaust; and means for supplying said high temperature catalytic burner exhaust to said means for heating and delivering whereby said burner exhaust supplies a portion of the heat required for heating said mixed gas exhaust to said reformer reaction temperatures.

3. The stack assembly of claim 2 further comprising condenser means for condensing water out of exhaust gases in said assembly; fourth conduit means operably interconnecting said means for heating and delivering said condenser means, said fourth conduit means being operable to deliver cooled catalytic burner exhaust from said means for heating and delivering to said condenser means, and said condenser means being operable to condense water fog out of said cooled catalytic burner exhaust; and wherein said second conduit means is operably connected to said condenser means.

4. The stack assembly of claim 3 further comprising turbine means and operably interconnected compressor means, said fourth conduit means being operable to deliver said cooled catalytic burner exhaust to said turbine means to operate the latter prior to being delivered to said condenser means, and said turbine means being operable to drive said compressor means to enable the latter to supply said pressurized air to said cathode means.

5. The stack assembly of claim 4 further comprising generator means operably connected to said turbine means for generating electricity upon operation of said turbine means.

6. The stack assembly of claim 2 further comprising heat exchanger means interposed between said anode means and said catalytic burner means, said heat exchanger means being operably connected to an exhaust side of said autothermal reformer to receive hot exhausted hydrogen enriched fuel gas from said reformer, and said heat exchanger means being operable to transfer heat from said hot exhausted hydrogen enriched fuel gas to said depleted hydrogen fuel gas exhaust prior to the latter being delivered to said catalytic burner.

7. A high pressure phosphoric acid fuel cell stack assembly comprising:

(a) a stack of fuel cells for producing electricity, said stack including cathode means, anode means, and heat exchange means;

(b) an autothermal reformer for reacting a hydrocarbon fuel with an air-water vapor gaseous mixture exhausted from said heat exchange means, said reformer being operable to produce a high temperature hydrogen enriched fuel gas for said anode means;

(c) a catalytic burner operable to catalytically burn hydrogen-depleted fuel gas exhausted from said anode means and the air-water vapor gaseous mixture to produce a high temperature burner exhaust gas;

(d) turbocompressor means for providing elevated operating pressures for said assembly, said turbocompressor means being driven by said burner exhaust gas;

(e) condenser means for receiving exhaust from said turbocompressor means and operable to condense a water fog coolant component from the turbocompressor exhaust;

(f) first conduit means for delivering compressed air from said turbocompressor means to said cathode means for passage through said cathode means to an exhaust side of said cathode means, whereat oxygen-depleted air and reaction water are exhausted from said cathode means;

(g) second conduit means for delivering oxygen-depleted air and reaction water from said exhaust side of said cathode means to said stack heat exchange means;

(h) third conduit means for delivering the water fog coolant component from said condenser means to said second conduit means whereby the oxygen-depleted air and reaction water are mixed with the water fog coolant component to form a water droplet-air coolant mixture for circulation through said stack heat exchange means whereby the stack is cooled by vaporization of the water droplet component of the coolant mixture, and the air-water vapor gaseous mixture is exhausted from said stack heat exchange means;

(i) first heat exchanger means operable to bring the high temperature enriched fuel gas from said reformer into heat exhange relationship with the hydrogen-depleted fuel gas from said anode means to raise the temperature of the hydrogen-depleted fuel gas prior to the latter entering said catalytic burner;

(j) second heat exchanger means operable to bring the high temperature hydrogen-enriched fuel gas, after passing through said first heat exchanger means, into heat exchange relationship with the air-water vapor gaseous mixture to raise the temperature of the air-water vapor gaseous mixture and to lower the temperature of the fuel gas to that at which it will be reacted in said anode means; and (k) third heat exchanger means operable to bring the air-water vapor gaseous mixture and the high temperature catalytic burner exhaust gas into heat exchange relationship after said second heat exchanger to raise the temperature of the air-water vapor gaseous mixture to that required for reaction in said catalytic burner and said autothermal reformer, and to lower the temperature of the burner exhaust gas to that required for driving said turbocompressor means.

* * * * *